United States Patent [19]

Horikawa

[11] Patent Number: 4,700,066
[45] Date of Patent: Oct. 13, 1987

[54] LIGHT BEAM SCANNING APPARATUS FOR READING OUT OR RECORDING AN IMAGE

[75] Inventor: Kazuo Horikawa, Nakai, Japan

[73] Assignee: Fuji Photo Film Co., Ltd., Minami-ashigara, Japan

[21] Appl. No.: 686,886

[22] Filed: Dec. 27, 1984

[30] Foreign Application Priority Data

Dec. 28, 1983 [JP] Japan .................................. 58-251916
Dec. 28, 1983 [JP] Japan .................................. 58-251917

[51] Int. Cl.$^4$ .............................................. H01J 5/16
[52] U.S. Cl. ...................................... 250/234; 250/235
[58] Field of Search ....................... 250/234, 235, 236; 350/6.6, 6.7; 358/293

[56] References Cited

U.S. PATENT DOCUMENTS 4,350,988  9/1982  Masegi ........................... 250/236 X Primary Examiner—Eugene R. LaRoche
Assistant Examiner—James C. Lee
Attorney, Agent, or Firm—Fleit, Jacobson, Cohn & Price

[57] ABSTRACT

In a light beam scanning apparatus, two photodetectors are positioned in spaced relation by a predetermined distance within a scanning region in a main scanning direction. The start and the end of scanning in the main scanning direction are detected by the photodetectors. The scanning speed of a main scanning means is controlled so that a predetermined number of pulses of a pulse signal having a predetermined period are input within the time between the start and the end of scanning in the main scanning direction. Or, a single photodetector is positioned within the scanning region, and the scanning time from the start of scanning to the photodetector is detected by use of the photodetector. The initial position of scanning is controlled so that a predetermined number of pulses of the pulse signal having a predetermined period are input within the scanning time.

5 Claims, 8 Drawing Figures

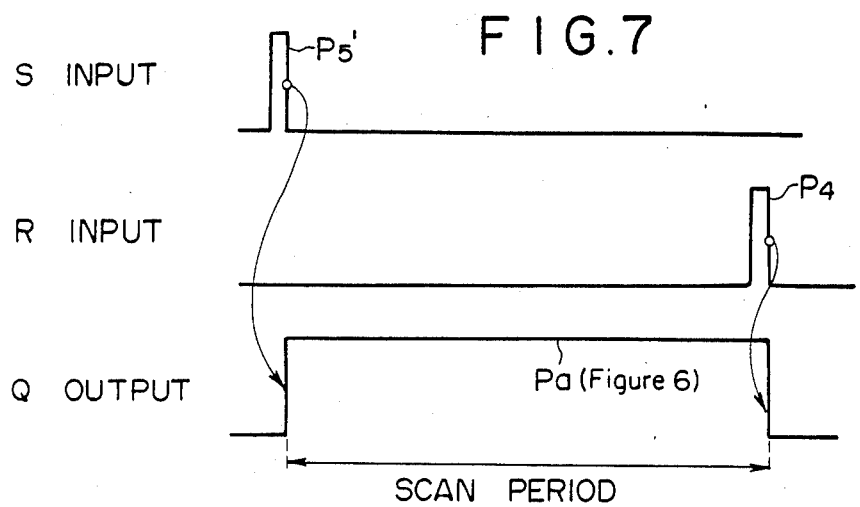
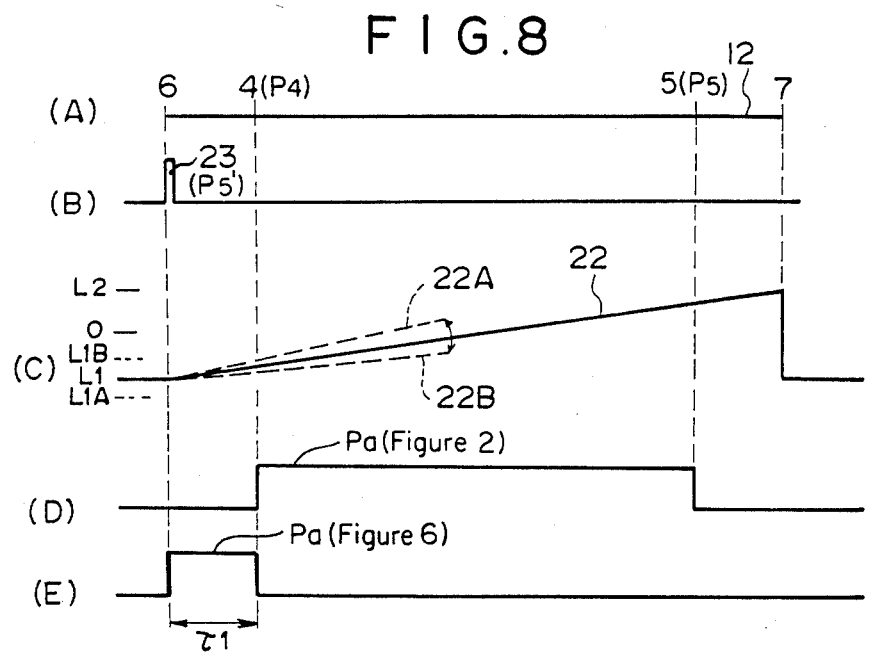

LIGHT BEAM SCANNING APPARATUS FOR READING OUT OR RECORDING AN IMAGE

BACKGROUND OF THE INVENTION

1. Field of the Invention

This invention relates to an apparatus for scanning with a light beam. This invention particularly relates to a light beam scanning apparatus used for reading out or recording an image.

2. Description of the Prior Art

In light beam scanning apparatuses, a light beam emitted by a laser beam source, for example, is reflected by a galvanometer mirror onto a recording medium so as to scan the recording medium in a main scanning direction and, at the same time, the recording medium is moved with respect to the light beam in a sub-scanning direction approximately normal to the main scanning direction by use of, for example, a mechanical feed means, thereby recording or reading out an image. In apparatuses for recording an image, image recording is conducted by modulating the light beam with an image signal by use of, for example, an acousto-optic modulator (AOM) and scanning the recording medium with the modulated light beam. In apparatuses for reading out an image, the recording medium carrying the image recorded thereon is scanned by the light beam and light reflected by the recording medium or light transmitted therethrough is detected to read out the image recorded on the recording medium. Particularly, in a radiation image read-out apparatus for reading out a radiation image stored in a stimulable phosphor sheet comprising a stimulable phosphor, the stimulable phosphor sheet is scanned by the light beam which, as stimulating rays, cause it to emit light in proportion to the radiation energy stored, and the emitted light is photoelectrically detected to read out the radiation image.

In the aforesaid image recording apparatus and the image read-out apparatus, scanning by the light beam should preferably be at a predetermined, constant scanning speed. For example, in the image recording apparatus, the image can be recorded uniformly when the exposure time per picture element is maintained constant. In the case of the image read-out apparatus, the image can be read out uniformly when the read-out time per picture element is constant. Also, the light beam should preferably be scanned over a predetermined scanning range. That is, scanning in the main scanning direction should preferably be started from a predetermined initial position, thereby consistently conducting the image scanning.

However, since the optical system of the light beam scanning apparatus comprises many mechanically moveable elements such as a mirror and a galvanometer, it is not always possible to manually adjust the moveable elements to the optimal condition and to maintain them in the optimal condition. For example, the initial position offset of the scanning beam is greatly affected even by a slight error in the mirror alignment or in the position of the light source. The optical system is also adversely affected by a change in ambient temperature.

Therefore, in order to obtain an image of high quality by scanning at a predetermined, constant scanning speed, a need exists for an apparatus wherein the necessity of manual adjustment is minimized and the initial position offset of the scanning light beam is adjusted automatically.

In view of the above circumstances, a light beam scanning apparatus which will be described below has been proposed in U.S. patent application Ser. No. 543,558 filed on Oct. 19, 1983. The apparatus comprises a scanning means for scanning a light beam in accordance with a first signal, a grid having a plurality of optical gratings arrayed in the scanning direction of the light beam and generating a second signal as the light beam is scanned on the grating array, and a control means for generating the first signal on the basis of the second signal. The control means detects the speed at which the light beam is scanned on the basis of the second signal, adjusts the first signal on the basis of the detected speed, and controls the light beam scanning speed so that the detected speed is maintained equal to a predetermined speed. In this apparatus, it becomes possible to scan the light beam at a predetermined, constant scanning speed. For example, when the light beam scanning apparatus is applied to image recording, it becomes possible to record an image uniformly. When the apparatus is applied to image read-out, it becomes possible to read out an image uniformly.

U.S. patent application Ser. No. 543,558 filed on Oct. 19, 1983 also proposes a light beam scanning apparatus comprising the aforesaid means wherein the control means detects the time required for the light beam to scan from a scanning start point to the end of the grating array on the basis of the second signal, and adjusts the initial level of the first signal on the basis of the detected time, thereby controlling the start point of scanning of the light beam. In this case, it becomes possible to automatically control any change in initial position offset amount of the scanning light beam which may be caused, for example, by an error due to manual adjustment of optical members or an error due to a change in ambient temperature. Thus scanning by the light beam can be adjusted to and maintained in the optimal condition.

However, in the aforesaid light beam scanning apparatus, the number of parts becomes large. Therefore, the apparatus becomes large and difficult to handle. Further, the manufacturing cost is high since the grid is expensive.

Also, the aforesaid light beam scanning apparatus is disadvantageous in that, when ambient dust sticks to the surface of the grid, it becomes impossible to obtain a consistent synchronizing signal for controlling the light beam scanning from the grid.

SUMMARY OF THE INVENTION

The primary object of the present invention is to provide a light beam scanning apparatus which can be fabricated at low cost and which is easy to operate.

Another object of the present invention is to provide a light beam scanning apparatus wherein a synchronizing signal for controlling the scanning by a light beam is obtained consistently and the scanning by the light beam is adjusted to and maintained in a desired condition even when dust adheres to an element of the apparatus.

The specific object of the present invention is to provide a light beam scanning apparatus wherein the initial position (start point) of scanning by a light beam is maintained at a predetermined position.

The light beam scanning apparatus in accordance with the present invention is characterized by positioning two photodetectors such as photo transistors in spaced relation by a predetermined distance within a scanning region in a main scanning direction, detecting the start and the end of scanning in the main scanning direction by the photodetectors, and controlling the scanning speed of a main scanning means so that a predetermined number of pulses of a pulse signal having a predetermined period are input within the time between the start and the end of scanning in the main scanning direction.

In the light beam scanning apparatus of the present invention, a scanned light beam is detected by use of two photodetectors positioned within the scanning region in the main scanning direction, and the scanning means is controlled so that the time of scanning by the light beam over the region between the two photodetectors is maintained constant. Therefore, it becomes possible to scan the light beam at a predetermined scanning speed. For example, when the light beam scanning apparatus is applied to image recording, it becomes possible to record an image uniformly. When the light beam scanning apparatus is applied to image read-out, it becomes possible to read out an image uniformly.

Also, in the light beam scanning apparatus of the present invention, there is no need to use expensive optical members as the light beam sensors, and two photodetectors such as photo transistors for generating a single pulse are used as the sensors. Therefore, the apparatus can be fabricated at a very low cost and is easy to operate. Further, the output pulses are obtained and no problem with regard to function arises even when some amount of dust or the like adheres to the light receiving faces of the photodetectors.

Specifically, two photodetectors are positioned, for example, outside of a material which should be scanned and adjacent the side end portions of the scanned material in the main scanning direction, and output pulses of the two photodetectors are received to obtain a square wave signal representing the scanning period, i.e. the time between the two pulses. The square wave signal is sent to a gate means, and a pulse signal having a predetermined period is further sent to the gate means. The pulses of the pulse signal which are sent from the gate means within the time corresponding to the scanning period are counted and the count is compared with a predetermined standard value. On the basis of the difference between the count and the standard value, the scanning speed of the main scanning means is controlled so that the light beam is always scanned at a predetermined speed.

The present invention also provides a light beam scanning apparatus characterized by positioning a single photodetector such as a photo transistor within a scanning region in a main scanning direction, detecting the scanning time elapsing from the start of the scanning in the main scanning direction to the photodetector by use of the photodetector, and controlling the initial position of the scanning in the main scanning direction so that a predetermined number of pulses of a pulse signal having a predetermined period are input within the scanning time.

In the light beam scanning apparatus of the present invention mentioned last, the start point of the scanning in the main scanning direction is detected, a light beam scanned by the photodetector positioned within the scanning region in the main scanning direction is detected, and the initial position of the scanning is controlled so that the time of scanning by the light beam over the region between the start point and the photodetector is maintained constant. Therefore, it becomes possible to scan the light beam from a predetermined initial position. For example, when the light beam scanning apparatus is applied to image recording, it becomes possible to record an image exactly in a predetermined region. When the light beam scanning apparatus is applied to image read-out, it becomes possible to exactly read out an image in the predetermined region.

Also, in the light beam scanning apparatus of the present invention mentioned last, no expensive optical member need be used as the light beam sensor, and a single photodetector such as a photo transistor for generating a single pulse is used as the sensor. Therefore, the apparatus can be fabricated at a very low cost and is easy to operate. Further, the output pulse is obtained and no problem with regard to the function arises even when some amount of dust or the like adheres to the light receiving face of the photodetector.

Specifically, in the light beam scanning apparatus of the present invention mentioned last, a square wave signal representing the scanning time from the start point of the scanning to the photodetector is obtained on the basis of, for example, an output signal of a means for detecting the initial position (start point) of the scanning in the main scanning direction and the output pulse of the photodetector positioned at an arbitrary position within the scanning range in the main scanning direction. The square wave signal is sent to a gate means, and a pulse signal having a predetermined period is further sent to the gate means. The pulses of the pulse signal which are sent from the gate means within the time corresponding to the scanning period are counted and the count is compared with a predetermined standard value. On the basis of the difference between the count and the standard value, the scanning start point of the main scanning means is controlled so that the light beam is always scanned from a predetermined initial position.

As described above, in the present invention, a square wave signal representing the scanning period and a pulse signal having a predetermined period generated by a pulse generating means are input to the gate means. The gate means outputs the pulses which are input thereto within the time corresponding to the scanning period (normally the high level period of the square wave signal). As the gate means, it is possible to use, for example, a two-input, one-output type TTL AND gate (74LS08 manufactured by Texas Instrument Inc.). The pulse signal generated by the gate means is sent to a counting means which counts the pulses of the pulse signal and outputs the count n, for example, as a decimal digital value.

As the counting means, it is possible to use, for example, a TTL decimal counter (74LS196 manufactured by Texas Instrument Inc.). Then, the count n generated by the counting means and a standard set value n0 which is specified by an external digital switch or the like are input to a comparison circuit. The comparison means calculates $n0-n$ and generates a difference signal, for example, a voltage $\Delta v$ proportional to the difference $n0-n$.

The difference signal is added to the previously output signal, and is sent to an integrator constituted by an operational amplifier or the like. The signal is converted by the integrator, for example, into a ramp function signal, i.e. a sawtooth wave signal, and is sent to a drive circuit of the main scanning means.

In the present invention, as the main scanning means, it is possible to use a galvanometer mirror or the like. As the photodetector, it is possible to use any device insofar as it can detect a light beam and output a positive logic pulse of approximately +5 V. For example, it is possible to use a commercially available photo transistor as the photodetector. As the square wave generating means, it is possible to use a TTL flip-flop (74LS74 manufactured by Texas Instrument Inc.) or the like.

Further, as the means for detecting the start point of the scanning in the main scanning direction in the apparatus of the present invention wherein the initial position of the scanning in the main scanning direction is controlled so that a predetermined number of pulses of a pulse signal having a predetermined period are input within the scanning time, it is possible to use various known means. For example, it is possible to use the synchronizing signal (pulse) or the scanning in the main scanning direction, or a pulse obtained by detecting the falling or rising position of the sawtooth wave signal of the scanning in the main scanning direction by use of a comparator or the like. The width of the aforesaid pulse is not limited, and the term "pulse" as used herein embraces a pulse having a large width so that only the rising edge or the falling edge of the pulse is used.

BRIEF DESCRIPTION OF THE DRAWINGS

FIG. 7 is a timing chart showing the outputs of the photodetector, the start point detector and the flip-flop in the circuit configuration of FIG. 6, and FIG. 8 is a flow chart showing the signals appearing at various sections of the circuit configurations of FIGS. 2 and 6 and the timing thereof.

DESCRIPTION OF THE PREFERRED EMBODIMENTS

The present invention will hereinbelow be described in further detail with reference to the accompanying drawings.

Figure 1:
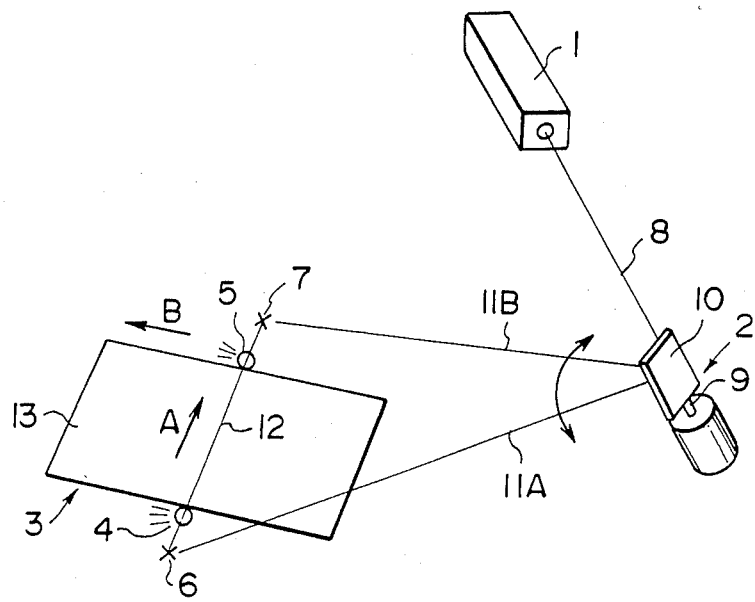
FIG. 1 is a perspective conceptual view showing an embodiment of the light beam scanning apparatus in accordance with the present invention.

FIG. 1 schematically shows an embodiment of the light beam scanning apparatus in accordance with the present invention. Basically, the light beam scanning apparatus comprises a laser beam source 1 constituted by a laser beam oscillator for generating a laser beam 8, and a galvanometer 2 for sweeping the laser beam 8.

A mirror 10 is secured to a rotation shaft 9 of the galvanometer 2 and is maintained at a mechanically neutral position when the galvanometer 2 is not driven. When the galvanometer 2 is driven, the mirror 10 is rotated back and forth about the neutral position in accordance with the drive current flowing in the galvanometer 2 so that the laser beam is swept from 11A to 11B. For example, the laser beam is swept to the 11A side when a negative voltage is applied to the galvanometer 2, and is swept to the 11B side when a positive voltage is applied thereto. When no voltage is applied to the galvanometer 2, the laser beam is maintained approximately at the neutral position. As described below, a start point 6 or an end point 7 of scanning by the laser beam 11A through the laser beam 11B is adjusted by changing the level of the negative or positive voltage applied to the galvanometer 2. When the change in voltage applied to the galvanometer 2 between the start point 6 and the end point 7 is linear, the scanning speed is adjusted by changing the gradient of the linear change in voltage.

Scanning of a recording medium 3 by the laser beam 11A through the laser beam 11B is adjusted so that sections outside of the recording medium 3 are also scanned to some extent.

As shown in FIG. 1, the recording medium 3 is, for example, a sheet-shaped recording medium for images which may include characters, and is fed by a feed mechanism (not shown) in the direction as indicated by the arrow B. Therefore, the recording medium 3 is scanned to form a scanning line 12 in the main scanning direction indicated by the arrow A by the rotation of the mirror 10 operated by the galvanometer 2, and is simultaneously fed in the sub-scanning direction as indicated by the arrow B. In this manner, a recording surface 13 of the recording medium 3 is scanned by the laser beam 11A through the laser beam 11B.

Photodetectors 4 and 5 for detecting the laser beam are positioned adjacent both edge portions of the recording medium 3 on the scanning line 12. In this embodiment, the photodetectors 4 and 5 are constituted by photo transistors for receiving the laser beam by light receiving faces and generating positive logic pulses of TTL level.

When the light beam scanning apparatus of FIG. 1 is applied to image read-out, read-out of an image recorded on the recording medium 3 is conducted by detecting the laser beam 11A through the laser beam 11B scanned as described above and reflected by the recording surface 13 or transmitted therethrough. By way of example, in the case where the recording medium 3 is an image recording medium comprising a stimulable phosphor carrying a radiation image stored therein, the stimulable phosphor is excited to emit light when exposed to the laser beam 11A through the laser beam 11B, and the radiation image is read out by detecting the emitted light. When the light beam scanning apparatus is applied to image recording, a photosensitive material is used as the recording medium 3, and an image is recorded on the photosensitive material by modulating the laser beam 8 emitted by the laser beam source 1 in accordance with an image signal by use of a modulating means (not shown) such as an acoustooptic modulator (AOM).

Figure 2:
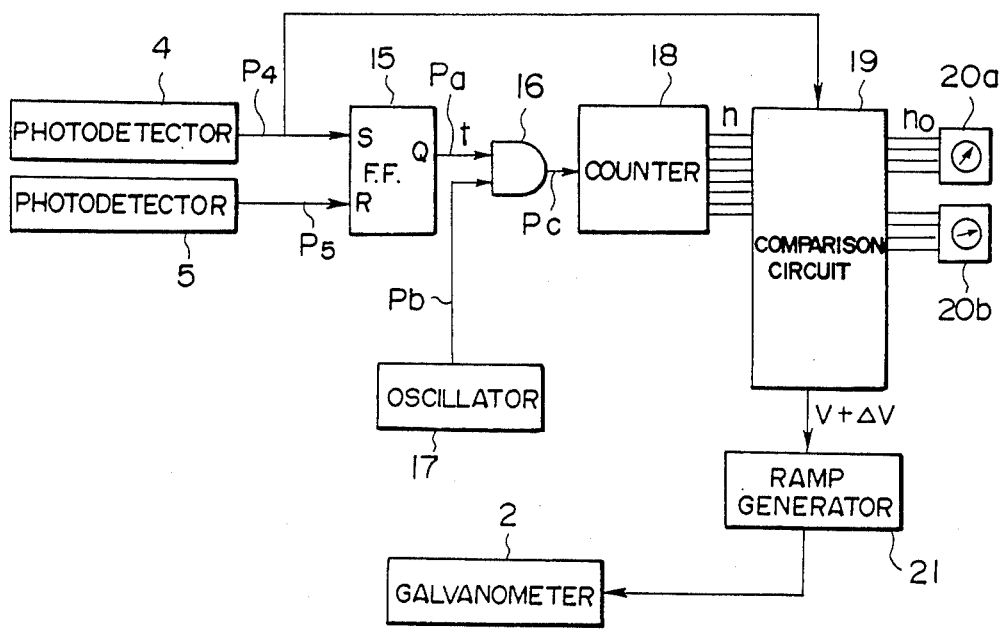
FIG. 2 is a block diagram showing an example of the circuit configuration for controlling the light beam scanning apparatus of FIG. 1.
Figure 3:
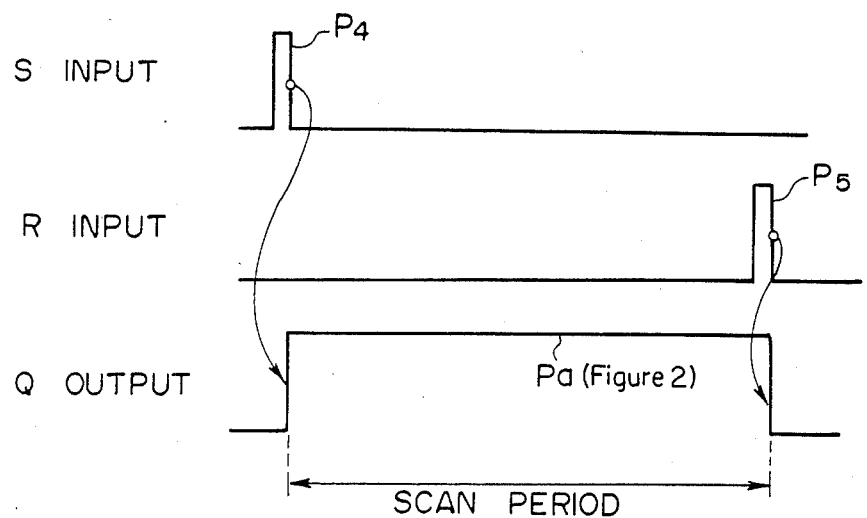
FIG. 3 is a timing chart showing the outputs of the photodetectors and the flip-flop in the circuit configuration of FIG. 2.

FIG. 2 shows an example of the circuit configuration for controlling the scanning in the main scanning direction in the apparatus of FIG. 1. In FIG. 2, similar elements are numbered with the same reference numerals with respect to FIG. 1. A pulse P4 generated by the photodetector 4 is sent to the set terminal S of an R-S type flip-flop 15, and a pulse P5 generated by the photodetector 5 is sent to the reset terminal R of the flip-flop 15. At this time, the flip-flop 15 outputs a high level, relatively long time duration square wave pulse Pa representing the scanning period between the photodetectors 4 and 5 from the output terminal Q. FIG. 3 shows the timing chart of the inputs and the output of the flip-flop 15.

Figure 4:
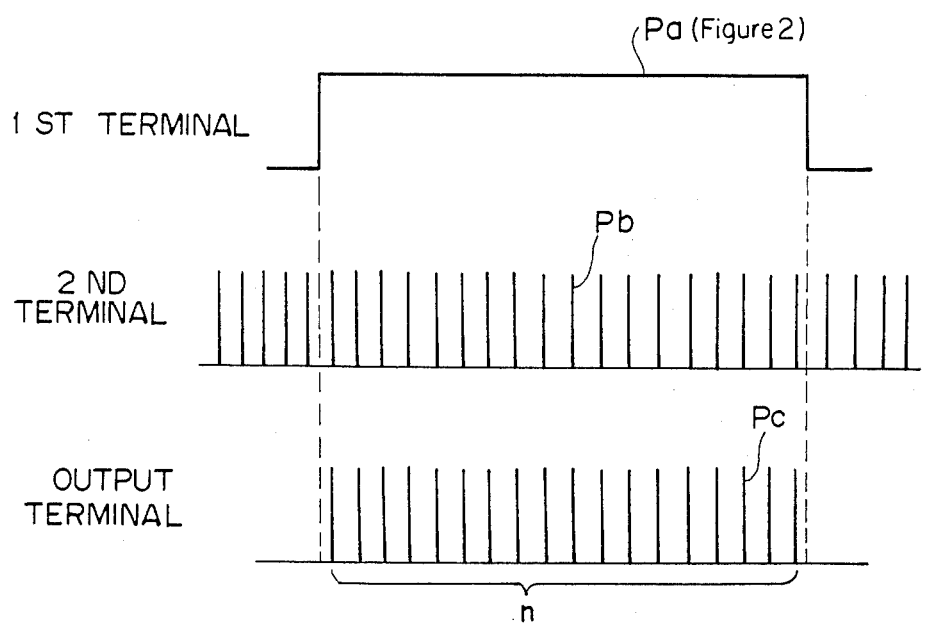
FIG. 4 is a timing chart showing the inputs and the output of the AND gate in the circuit configuration of FIG. 2.

The square wave pulse Pa is sent to the first terminal of an AND gate 16 constituted by a 74LS08 or the like, and a pulse signal Pb generated by a oscillator 17 for generating digital pulses of a predetermined period is sent to the second terminal of the gate 16. From an output terminal of the gate 16 are generated digital pulses Pc in a number corresponding to the number of pulses Pb input to the second terminal of the gate 16 within the time corresponding to the aforesaid scanning period. FIG. 4 shows the timing chart of the inputs and the output of the gate 16.

The pulses Pc generated by the gate 16 are sent to a counter 18 which is constituted by a decimal counter (74LS196) or the like and which counts the pulses Pc. The count n of the pulses Pc is sent to a comparison circuit 19. On the other hand, a standard set value n0 representing the number of pulses which should be generated within the time corresponding to the scanning period is specified by external digital switches 20a and 20b, and is sent to the comparison circuit 19. The comparison circuit 19 compares the count n and the standard set value n0 with each other, and generates a voltage $\Delta v$ proportional to the difference $n0-n$. The voltage $\Delta v$ is superposed on a standard voltage V which has previously been output, and the voltage $V+\Delta v$ is applied to a ramp generator 21. The ramp generator 21 generates a saw tooth wave output 22 having the required changed gradient (e.g., between 22A-22B in FIG. 8) as indicated previosuly and sends it to the galvanometer 2.

The mirror 10 secured to the galvanometer 2 is rotated by the saw tooth wave output, and the laser beam 8 is swept from 11A to 11B, thereby forming the scanning line 12. The laser beam 11A through the laser beam 11B also scan the photodetectors 4 and 5, causing the photodetectors 4 and 5 to generate the aforesaid pulses P4 and P5.

A good linear relationship is maintained between the signal applied to the galvanometer 2 and the positions of the scanning laser beam 11A through the laser beam 11B.

Therefore, when the voltage $\Delta v$ representing the difference between the pulse count n in the region from the photodetector 4 to the photodetector 5 and the standard pulse count n0 is zero, the rotation speed of the mirror 10 secured to the galvanometer 2 is maintained unchanged. When the difference is large, the rotation speed of the mirror 10 is changed to minimize the difference.

As described above, the galvanometer 2 is controlled so that the pulse count n between the photodetectors 4 and 5 becomes equal to n0, and the scanning speed of the laser beam is controlled thereby so that it becomes equal to a predetermined value.

Figure 5:
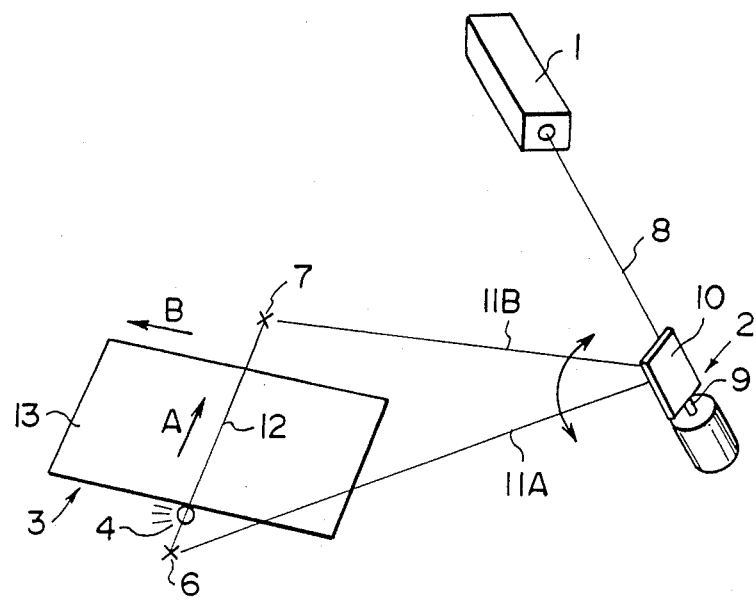
FIG. 5 is a perspective conceptual view showing another embodiment of the light beam scanning apparatus in accordance with the present invention.

FIG. 5 shows another embodiment of the light beam scanning apparatus in accordance with the present invention. In FIG. 5, similar elements are numbered with the same reference numerals with respect to FIG. 1. In this embodiment, a single photodetector 4 for detecting the laser beam is positioned adjacent one edge portion of the recording medium 3 on the scanning line 12.

Figure 6:
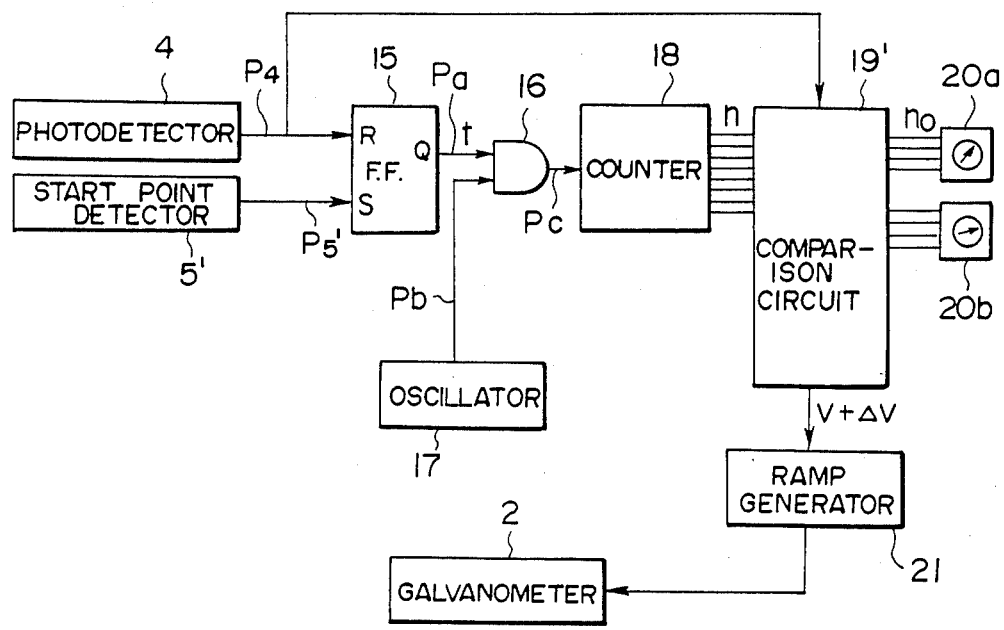
FIG. 6 is a block diagram showing an example of the circuit configuration for controlling the light beam scanning apparatus of FIG. 5.

FIG. 6 shows an example of the circuit configuration for controlling the scanning in the main scanning direction in the apparatus of FIG. 5. In FIG. 6, similar elements are numbered with the same reference numerals with respect to FIGS. 2 and 5. FIG. 7 shows a timing chart of the inputs and the output of a flip flop 15 in FIG. 6 and FIG. 8 shows the signals appearing at various sections of the circuit configuration of FIG. 6. A pulse P5' (also designated 23 in FIG. 8) generated by a means 5' (for example, a synchronizing signal detector) for detecting the start point 6 of the scanning in the main scanning direction is sent to the set terminal S of the R-S type flip-flop 15. The pulse P4 (indicated at 4 in FIG. 8) generated by the photodetector 4 is sent to the reset terminal R of the flip-flop 15. From the output terminal Q of the flip-flop 15 is output the high level square wave pulse Pa representing the scanning period in FIG. 8 between the start point detector 5' and the photodetector 4.

The square wave pulse Pa and the pulse signal Pb are sent to the input terminals of the AND gate 16, and pulses Pc are output from the output terminal of the gate 16 at the same timing as the timing shown in FIG. 4.

The pulses Pc generated by the gate 16 are sent to pulses Pc, which represents an actual offset of the start point 6 from the adjacent edge of the material, is sent to a comparison circuit 19' which compares the count h and a standard set value n0, which represents a standard offset of the start point 6 from the adjacent edge of the material 13, with each other, and generates an error voltage $\Delta v$ proportional to the difference $n0-n$. The voltage $\Delta v$ is superposed on a standard voltage V which has previously been output, and the voltage $V+\Delta v$ is applied to the ramp generator 21. The ramp generator 21 generates a sawtooth wave output 22 having an adjusted initial level (e.g., represented by the designations L1A, L1, L1B, O and L2 in FIG. 8) which corresponds to the desired start point position for the next scan and sends it to the galvanometer 2.

The mirror 10 secured to the galvanometer 2 is rotated by the sawtooth wave output, and the laser beam 8 is swept from 11A to 11B, thereby forming the scanning line 12. The laser beam 11A through the laser beam 11B also scan the photodetector 4, and the aforesaid pulse P4 is generated by the photodetector 4. Also, the detection pulse P5' representing the start point 6 is generated at the same time by the start point detector 5'.

When the voltage $\Delta v$ representing the difference between the pulse count n in the region from the start point detector 5' to the photodetector 4 and the standard pulse count n0 is zero, the initial position of the mirror 10 secured to the galvanometer 2 is maintained unchanged. When the difference is large, the initial position of the mirror 10 is changed to minimize the difference.

As described above, the galvanometer 2 is controlled so that the pulse count n becomes equal to n0, and the initial position of the laser beam is controlled thereby so that it is always the same.

Instead of conducting the detection of the start point 6 of the scanning in the main scanning direction by use of the synchronizing signal (pulse) of the scanning in the main scanning direction, it is also possible to effect the detection of the start point 6 by detecting the rising edge or the falling edge of the galvanometer drive sawtooth wave signal.

I claim:

1. A light beam scanning apparatus comprising:

(i) a scanning means for scanning a material, which is to be scanned, by a light beam in accordance with a scanning means control signal, (ii) a single photodetector positioned within a scanning region of said light beam for detecting said light beam and generating a pulse, (iii) a start point detecting means for detecting a start point of each scanning by said scanning means and generating a signal corresponding to said start point, (iv) a means for receiving said signal corresponding to said start point and an output pulse of said photodetector and calculating the time between said signal and said pulse, and (v) a control means for adjusting an initial level of said scanning means control signal on the basis of the calculated time and controlling the start point of scanning by said light beam.

2. An apparatus as defined in claim 1 wherein said means for calculating the time between said signal corresponding to said start point and said output pulse of said photodetector is provided with a counter for receiving pulses from an oscillator which generates digital pulses of a predetermined period, receiving said signal corresponding to said start point and said output pulse of said photodetector, and counting said pulses of the predetermined period which are input between said signal and said output pulse.

3. An apparatus as defined in claim 2 wherein said control means comprises a comparison circuit for comparing an output of said counter with a predetermined value, and a means for adjusting the initial level of said scanning means control signal on the basis of an output of said comparison circuit.

4. An apparatus as defined in claim 3 wherein said means for adjusting said initial level adjusts said initial level so that the difference between the output of said counter and the predetermined count is minimized.

5. An apparatus as defined in claim 4, wherein the calculating means produces a long time duration output pulse having a time duration corresponding to the time between said start point signal and said photodetector output pulse, the counter is a digital counter which counts said pulses of said oscillator during said long time duration output pulse, to produce a digital output signal representative of the number of oscillator pulses counted, and the comparison means is of a digital type.

* * * * *